(12) United States Patent
Lowe, Jr.

(10) Patent No.: US 6,270,036 B1
(45) Date of Patent: Aug. 7, 2001

(54) BLOWN AIR LIFT GENERATING ROTATING AIRFOIL AIRCRAFT

(76) Inventor: Charles S. Lowe, Jr., 2240 Berks Rd., Lansdale, PA (US) 19446

( * ) Notice: Subject to any disclaimer, the term of this patent is extended or adjusted under 35 U.S.C. 154(b) by 0 days.

(21) Appl. No.: 09/398,962

(22) Filed: Sep. 16, 1999

Related U.S. Application Data

(63) Continuation-in-part of application No. 08/788,535, filed on Jan. 24, 1997, now Pat. No. 6,016,991.

(51) Int. Cl.$^7$ .............................. B64C 15/00; B64C 29/00
(52) U.S. Cl. ........................................ 244/12.2; 244/23 C
(58) Field of Search ....................... 244/12.2, 23 C, 244/23 R, 30, 29

(56) References Cited

U.S. PATENT DOCUMENTS

| | | | |
|---|---|---|---|
| 205,319 | 6/1878 | Tracey | 244/125 |
| 998,538 | 7/1911 | Lehmann | 244/97 |
| 1,119,710 | 3/1914 | Maurer | 244/39 |
| 1,390,745 | 9/1921 | Armstrong | 244/30 |
| 3,053,483 | 9/1962 | Stahmer | 244/29 |
| 3,107,071 * | 10/1963 | Wessels | 244/23 R |
| 3,199,809 | 8/1965 | Modesti | 244/12 |
| 3,276,723 * | 10/1966 | Miller et al. | 244/12.2 |
| 3,420,473 | 1/1969 | Krafft | 244/30 |
| 3,537,669 | 11/1970 | Modesti | 244/23 |
| 4,032,086 | 6/1977 | Cooke | 244/30 |
| 4,113,206 | 9/1978 | Wheeler | 244/31 |
| 4,269,375 | 10/1979 | Hickey | 244/26 |
| 4,366,936 | 1/1983 | Ferguson | 244/2 |
| 4,452,410 | 6/1984 | Everett | 244/12.2 |
| 4,534,525 | 8/1985 | Bliamptis | 244/30 |
| 4,606,515 | 8/1986 | Hickey | 244/24 |
| 4,711,416 | 12/1987 | Regipa | 244/31 |
| 4,941,628 * | 7/1990 | Sakamoto et al. | 244/12.2 |
| 5,054,713 * | 10/1991 | Langley et al. | 244/12.2 |
| 5,170,963 * | 12/1992 | Beck, Jr. | 244/12.2 |
| 5,203,521 * | 4/1993 | Day | 244/12.2 |
| 5,351,911 | 10/1994 | Neumayr | 244/23 |
| 6,073,881 * | 6/2000 | Chen | 244/23 C |

* cited by examiner

Primary Examiner—Charles T. Jordan
Assistant Examiner—Christian M. Best
(74) Attorney, Agent, or Firm—Michael F. Petock, Esq.

(57) ABSTRACT

A rotating airfoil aircraft utilizing blown air from a centrifugal fan located at its center to produce lift by causing airflow to travel over the upper surface of the airfoil and outwardly and downwardly from the lower surface of the airfoil. The airflow over the upper surface produces lift by causing a reduced pressure in the blown air current and the downwardly directed air produces an upward lift. This lifting force is used in connection with other lift produced by various factors including the airfoil traveling laterally through ambient air and, particularly during takeoff and landing, by means of the downward exhaust of an engine such as a jet engine. The rapidly rotating airfoil aircraft provides an advantage of providing the leading edge an opportunity to cool during a major portion of each rotation, thereby reducing the effective degree of leading edge heating caused during lateral flight.

17 Claims, 8 Drawing Sheets

US 6,270,036 B1

BLOWN AIR LIFT GENERATING ROTATING AIRFOIL AIRCRAFT

CROSS REFERENCE TO RELATED APPLICATION

This application is a continuation-in-part application of application Ser. No. 08/788,535, filed Jan. 24, 1997 by the inventor herein, entitled Evacuated Rotating Envelope Aircraft, now U.S. Pat. No. 6,016,991. The benefit of the earlier filing date of this application for so much as is common is claimed in this application. The teachings of the aforesaid application are incorporated herein by reference the same as if set forth at length.

FIELD OF INVENTION

The present invention relates to a new and unobvious type of a circular or round rotating airfoil aircraft and methods associated with enabling aircraft flight. More particularly, the present invention is directed to a new and unobvious aircraft which utilizes in flight an actively blown circular or round airfoil to produce vertical lift.

BACKGROUND OF THE INVENTION

Man has been able to cause powered aircraft to fly through the atmosphere since the early part of the Twentieth Century. Much work has been done and continues to be done in developing improved and more versatile aircraft.

The most commonly used type of aircraft today requires enormous landing strips for take off and landing. However, over the years, much work has been done in attempting to develop suitable, practical and improved vertical take off and landing (VTOL) aircraft. These have included helicopters as well as dirigibles, balloons and blimps.

Lighter-than-air- aircraft such as dirigibles and the like which utilize helium or other lighter-than-air gases have the disadvantage of not only the need to supply the lighter-than-air gas itself, the need to increase and decrease the volume of the gas for ascent and descent, the substantial structure, including its weight, for containing the lighter-than-air gas and the very large structure sizes required to house gases which are only somewhat lighter than air.

Helicopters are a much heavier-than-air aircraft requiring rotating propeller blade structures. Some attempt has also been made for providing vertical take off either by the means of propellers or rockets, sometimes mounted on wings which may be directed vertically for take off and horizontally for lateral flight.

However, none of these prior art devices nor any combination of them teaches or suggests a new class of aircraft as discussed and claimed herein.

SUMMARY OF THE INVENTION

The present invention creates a new category of aircraft or air transport vehicle. The present invention further includes new methods of achieving vertical take off and landing and flight in an economical, efficient and effective manner.

The present invention provides numerous advantages. An advantage of the present invention is that it provides an aircraft with vertical take off and landing (VTOL) capabilities thereby eliminating the need for enormous take off and landing runways. The VTOL capabilities of the present invention significantly reduce infrastructure requirements at ground-based air terminal facilities with consequent and substantial reductions in the environmental and economic impacts of such terminals, regardless of whether there are a small number of large terminal facilities or a large number of small terminal facilities.

Another advantage of the present invention is that its VTOL capabilities substantially improve the safety attributes of the aircraft as contrasted with most conventional aircraft since emergency landings may be safely conducted at vastly more locations.

Another advantage of the present invention is reduction in likelihood of sudden precipitous descent typically encountered by aircraft such as helicopters on the occurrence of a mechanical failure.

Another advantage of the present invention is that it provides an aircraft with a rotating airfoil that provides significant inertial stability to the total aircraft to resist outside disturbances and, therefore, provide a smooth flight.

Another advantage of the present invention is that it is able to provide such an aircraft constructed and operated as a light-weight vehicle by utilizing centrifugal force to provide structural rigidity to the rotating airfoil. This structural rigidity resulting from centrifugal force provides resistance to the external forces associated with airfoil lift and provides resistance to the external forces associated with aerodynamic pressure on the airfoil that occur when the aircraft is traveling in a lateral direction.

Another advantage of the present invention is the ability to provide control in flight utilizing both the lift of a blown rotating airfoil as well as the conventional lift provided by a conventional airfoil moving laterally depending upon the conditions of flight.

Another advantage of the present invention is that it provides an aircraft that is capable of both high speed, long distance, intercontinental operations as well as being a highly maneuverable VTOL aircraft thereby enabling a given volume of airspace to be safely occupied by a substantially larger number of aircraft.

Another advantage of the present invention is that it provides more efficient airspace utilization both at terminal locations as well as in areas between such terminal or airport locations thereby helping to reduce the growing problem of airspace congestion.

Another advantage of the present invention is that it provides an aircraft that is significantly more economical to manufacture and to operate and one that utilizes infrastructure and environmental resources much more efficiently.

Another advantage of the present invention is that it provides an aircraft that is significantly more fuel efficient thereby reducing the cost of air transport as well as reducing consequent chemical and noise pollution of the atmosphere.

Another advantage of the present invention is that aircraft based on the present invention may also incorporate the unique features, benefits and advantages provided by the invention entitled Evacuated Rotating Envelope Aircraft, of U.S. Pat. No. 6,016,991, particularly for larger aircraft.

Another advantage of the present invention is that it provides an aircraft that incorporates a rotating airfoil that provides the primary source of lift during lateral flight. The fact that this airfoil rotates provides an opportunity for cooling of the leading edge of the airfoil as portions of it rotate into and out of the area of maximum aerodynamic heating.

Briefly and basically, in accordance with the present invention, an aircraft is disclosed wherein vertical lift is provided by means of a blown rotating airfoil. In other words, in accordance with the present invention, air is caused to flow over a rotating airfoil producing reduced pressure above the airfoil and airflow is directed downwardly under the rotating airfoil, both producing an upward force or lift on the aircraft. The invention also contemplates employing the centrifugal force or inertial force of rotation of the rotating airfoil to augment the structural rigidity of the aircraft and to thereby improve its cost effectiveness. The terms centrifugal force and inertial force of rotation are used herein throughout interchangeably.

Further, in accordance with the present invention, the means for rotating the envelope is attached to the rotating airfoil and rotates with the airfoil. The means for rotating the envelope may be an engine (et, turbojet, turbofan or even turboprop), which provides sufficient force to rotate the airfoil against the force of air friction acting upon the external surfaces of the airfoil and to operate the centrifugal air fan(s) rotating with the airfoil.

Further, in accordance with the present invention, means such as exhaust baffles or deflectors are provided for dividing the output air exhaust of the central engine(s) into multiple flow streams with a purpose of creating a rotating torque force on the central engine(s) and the attached airfoil.

Further, in accordance with the present invention, the means for rotating is selected to provide rotation necessary to provide a sufficient centrifugal force on the material of the rotating airfoil whereby the need for and weight of mechanical support structures to withstand lifting forces and the forces produced by aerodynamic pressures on the airfoil may be reduced and/or minimized.

Further, the means for rotation of the envelope causes the envelope to rotate about an axis normal to the direction of lateral motion of the aircraft during flight thereby exposing the leading edges and surfaces of the airfoil to aerodynamic heating caused by contact with atmosphere during only a portion of each rotation of the airfoil. Rotation of the airfoil allows the heat to be dissipated as the heated portion of the airfoil rotates away from the leading edge position during each revolution.

Further, in accordance with the present invention, lift for the aircraft is also provided by lateral airfoil lift (Bernoulli effect principle) as produced by the wings on a conventional, commercial air plane, in contemporary use due to the lateral movement of the aircraft through the atmosphere.

Further, in accordance with the present invention, a payload compartment may be provided, mounted to said rotating airfoil by bearings whereby the rotating airfoil may be rotated without rotation of the payload compartment.

Further, in accordance with the present invention, the non-rotating payload compartment may be provided with lateral jets for enhancing the lateral motion of the aircraft during flight.

Further, other variations will be apparent to those skilled in the art.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENT

Figure 1:
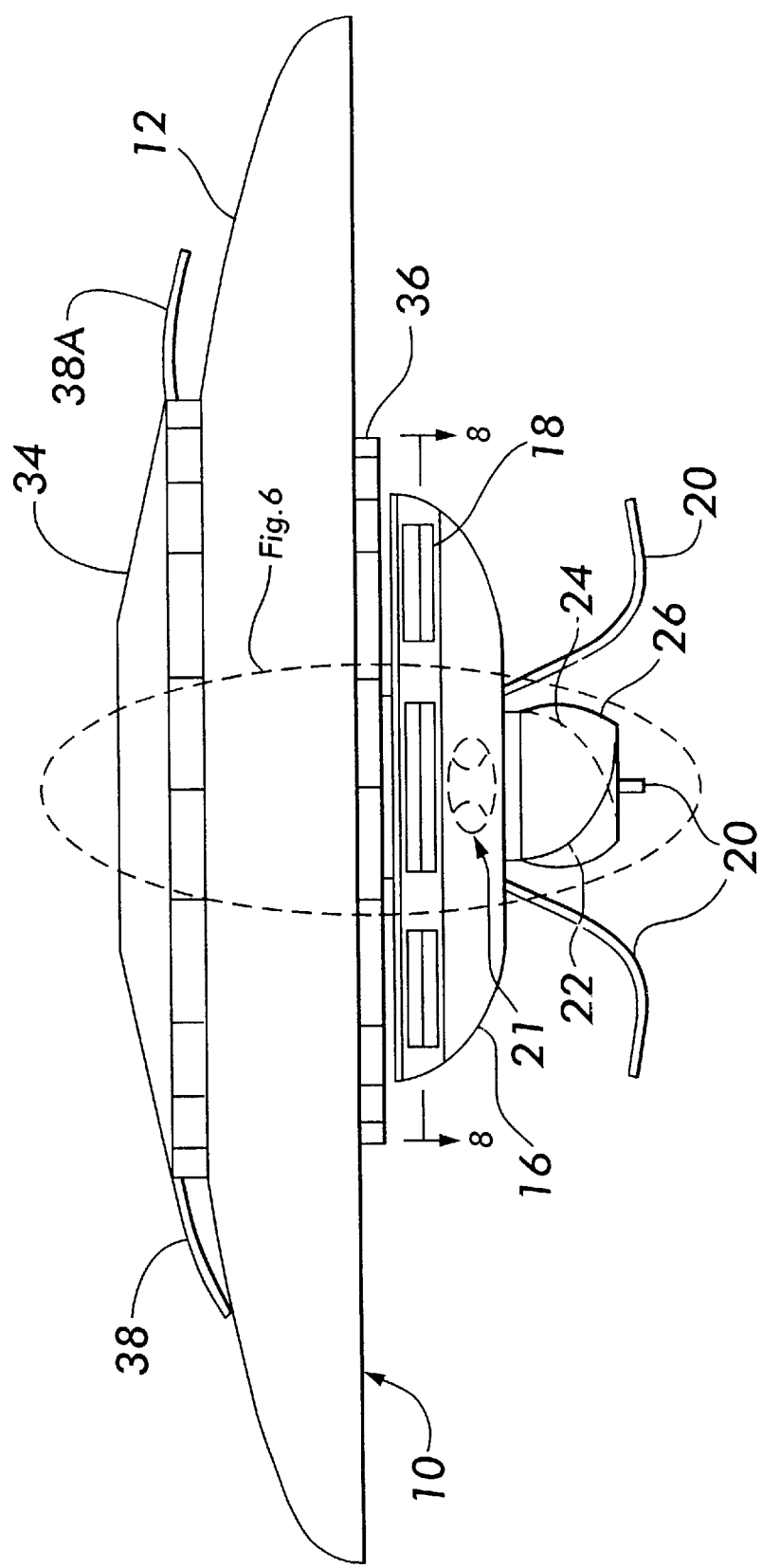
FIG. 1 is an elevation view of the present invention illustrating major externally visible components.

Referring now to the drawings in detail wherein like numerals indicate like elements, there is shown in FIG. 1 an aircraft 10 in accordance with the present invention. Aircraft 10 includes a circular or round airfoil 12 which is adapted to be rotated and, in a presently preferred embodiment, have air drawn from the ambient atmosphere blown across the upper surface of the airfoil by means of an upper centrifugal fan 34. Lower centrifugal fan 36 forces air outwardly and downwardly under the airfoil. The airflow across the upper and lower surfaces of the airfoil may be generated by a single fan or blower, but preferably, these may be by two separate fans. Further, it is understood that any type of appropriate fan or other air moving device may be utilized to generate this airflow, but preferably a centrifugal fan would be utilized. Preferably, both upper centrifugal fan 34 and lower centrifugal fan 36 are attached to the airfoil 12 and rotate with it. The lower centrifugal fan 36 is optional, however it is included in the preferred embodiment shown in FIG. 1 and described herein. The air flow emanating from the upper fan 34 and traveling over the upper surface of the airfoil 12 is depicted by flow arrow 78 in FIG. 2. Similarly, the air flow emanating from the lower fan 36 and traveling under the lower surface of the airfoil 12 is indicated by flow arrow 80 in FIG. 2. These two air flow streams 78 and 80 act upon the airfoil 12 to create a lower-than-ambient air pressure over the top of the exposed airfoil and a higher-than-ambient air pressure under the bottom of the airfoil 12 thereby causing the airfoil to have net pressures on it in the upward direction. Additionally, the rotation of the airfoil 12 and the attached fans 34 and 36 causes the materials that these components are made of to encounter centrifugal force and this centrifugal force enhances or increases the structural rigidity of these components enabling them to be made of lighter weight materials than would otherwise be the case.

FIG. 1 indicates upper fan exhaust cover 38 in the closed position and upper fan exhaust cover 38A in the open position. The exhaust covers are all actuated to be in the open position in those particular flight regimes when fan-driven air flow is required over the upper surface of the airfoil 12 to generate lift for the aircraft. Conversely, the upper fan exhaust covers 38 are all actuated to be in the closed position when the upper surface of the airfoil is being used to generate lift by moving laterally with respect to the ambient atmospheric environment.

Still most particularly referring to FIG. 1, there is shown a non-rotating payload compartment 16. Payload compartment 16 may carry people, weapons, goods or any other type of item needed to be transported by air. Although not shown, payload compartment 16 may be provided with windows or viewing ports. Preferably, payload compartment 16 may be equipped with an electronic external viewing system which may be more aerodynamically effective, efficient and economical. Also shown in FIG. 1 is a plurality of lateral motion jet ports 18. These may be integrally formed as a part of the payload compartment or may be a separate structure above or below the payload compartment. As illustrated in the presently preferred embodiment, the lateral motion jet ports are formed integrally with the payload compartment.

In addition to the lateral motion jet ports 18, payload compartment 16 may be equipped with one or more engines to provide additional lateral thrust thereby enhancing lateral velocity. One such engine is shown in dotted outline at 21. This may be a jet engine or any other type of suitable engine. Additional such engines may be located around the payload compartment, preferably one being on each side or in each quadrant, but more or less may be utilized as desired. Further, these engines are optional.

Also shown in FIG. 1 is a plurality of light-weight landing gear 20. Preferably, three such landing gear would be utilized, although any other suitable number may be utilized such as 4, 5, 6 or any other suitable number.

Also shown in FIG. 1 are moveable exhaust deflectors 22 and 24 along with an exhaust divider plate 26. Exhaust deflector 24 is shown in dotted line because it is behind exhaust divider plate 26.

Figure 2:
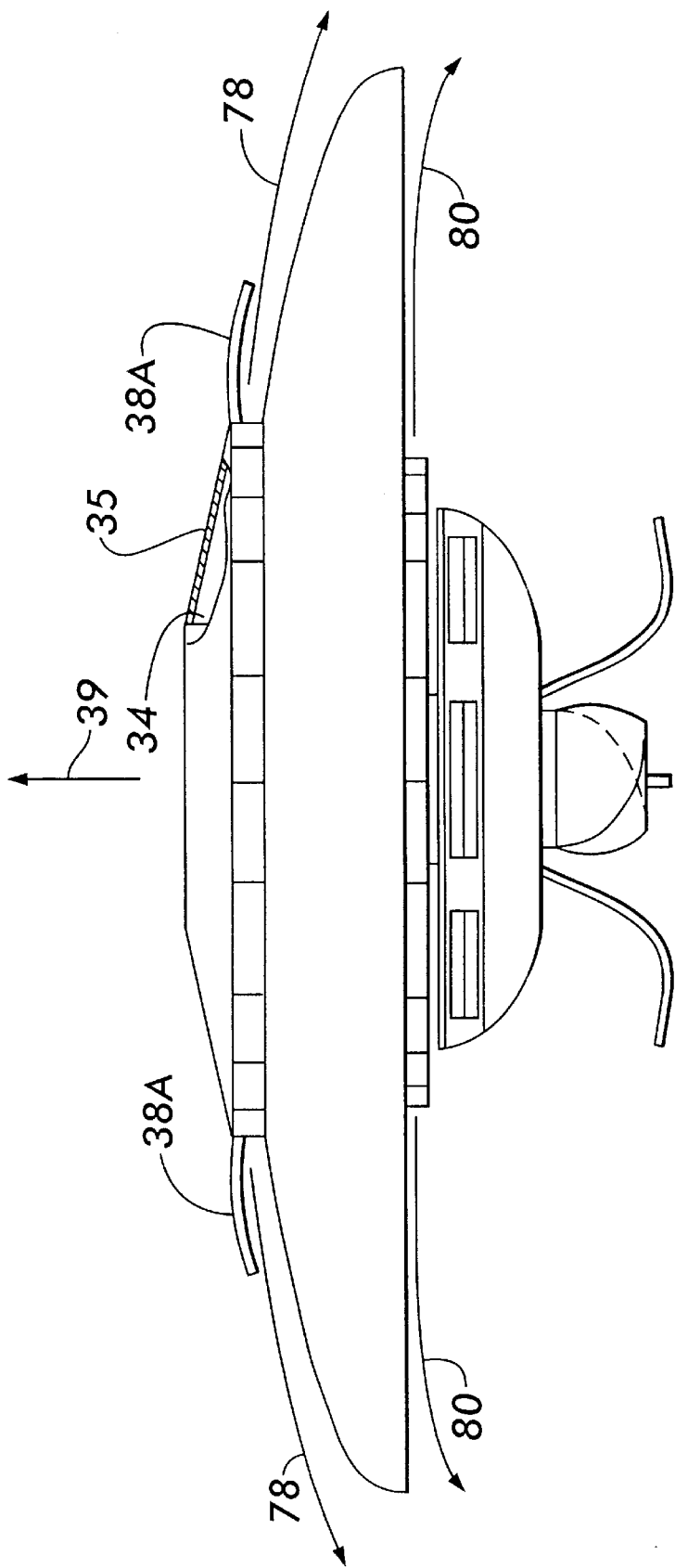
FIG. 2 is an elevation view, partially broken away, of the present invention indicating air flow directions over and under the rotating airfoil without lateral motion of the aircraft.

Referring to FIG. 2, the air flows passing outward over the top and bottom surfaces of the rotating airfoil that result from the actions of the upper and lower fans 34 and 36, respectively, are depicted by flow arrows 78 and 80, respectively, as described previously. Also shown in FIG. 2, two of the plurality of upper fan exhaust covers 38A are in the open position enabling the air outflow from the upper fan to blow or force air flow across the top surface of the airfoil and generate a lifting force in the direction of arrow 39 on this surface.

Figure 3:
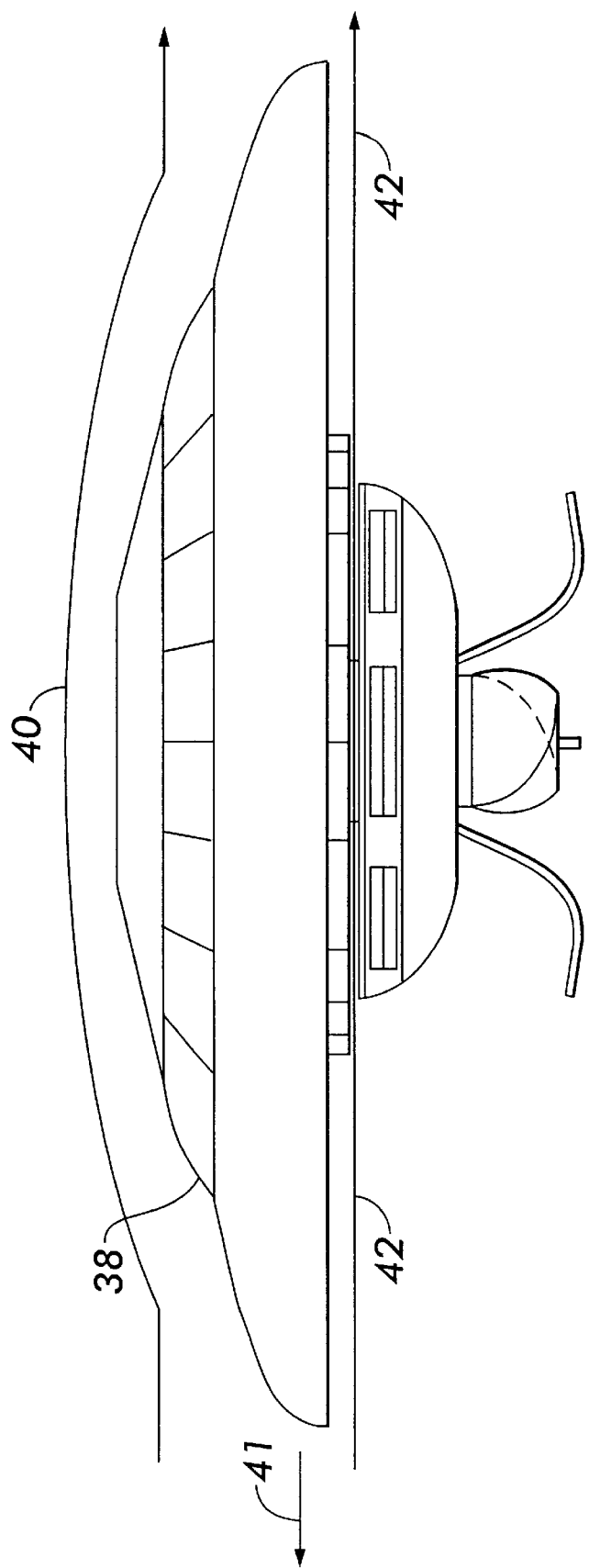
FIG. 3 is an elevation view of the present invention indicating air flow directions over and under the airfoil during lateral motion.

FIG. 3 indicates the air streams flowing over and under the airfoil 12 while it is moving at full speed in the lateral direction shown by arrow 41. Flow arrow 40 indicates relative air flow over the top of the airfoil and flow arrow 42 indicates airflow under the bottom of the airfoil. These air flows are designed to produce lift in the airfoil of the present invention while it is in lateral motion relative to the ambient atmospheric environment in much the same way that a wing on a conventional commercial fixed-wing air plane produces lift.

Figure 4:
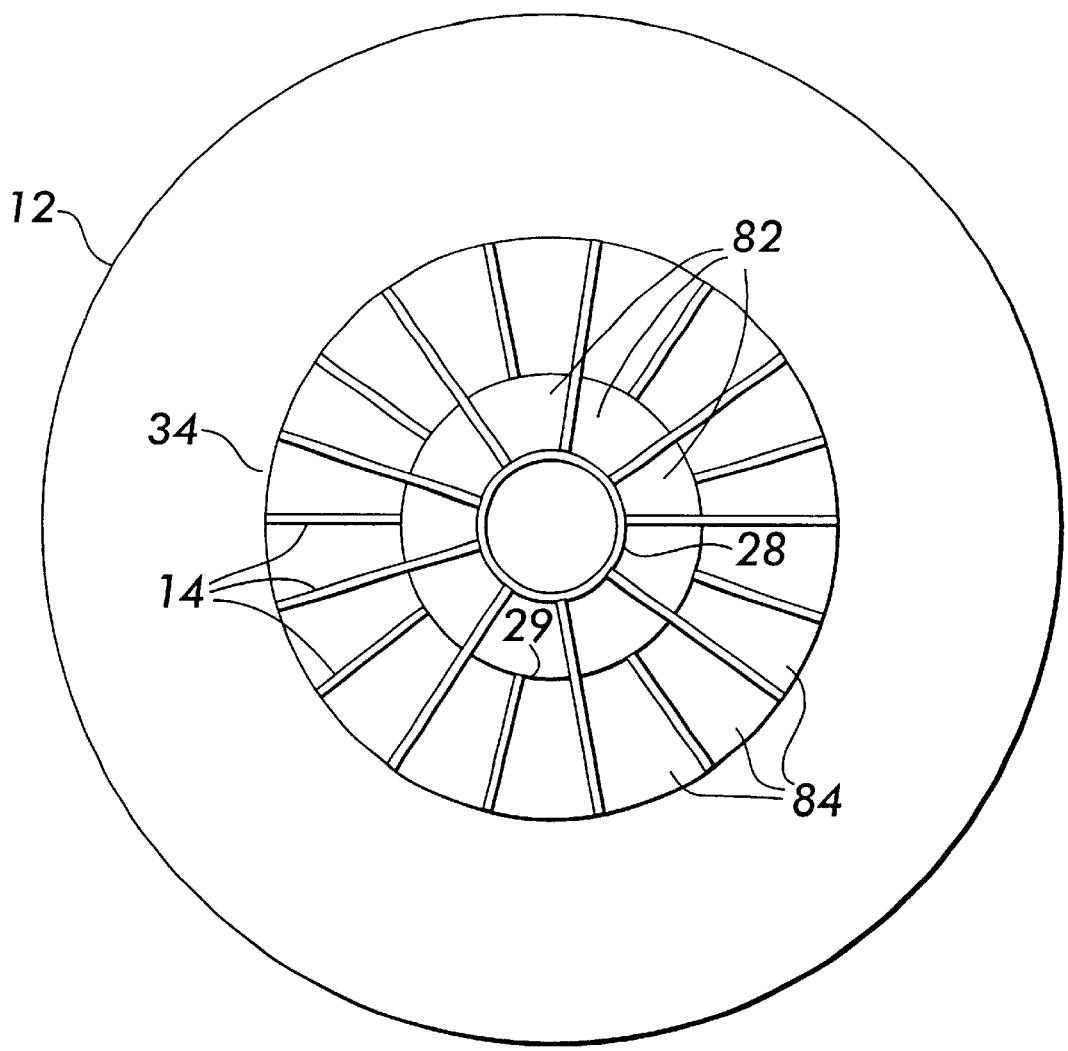
FIG. 4 is a top view of the blown rotating airfoil with its top cover and exhaust covers removed.

Referring now to FIG. 4 where a top view of the blown air lift generating rotating airfoil is shown with the top cover 35 and the exhaust covers 38 of the upper fan 34 removed for clarity of illustration. The airfoil 12 and the upper fan 34 are shown as previously discussed. The fan blades 14 of the upper fan, a centrifugal type fan, are shown with half of them in this particular illustration being connected to the central core tube 28. Between the central core tube 28 and the next larger concentric tube 29 are a plurality of air passage ways 82 that conduct outside air from above the aircraft into both the center area of upper fan 34, and, via vertical air channels 82 into the central area of lower fan 36. Lower fan 36, also a centrifugal type fan, is organized in a very similar fashion. The dimensions of each fan, the shape and quantity of blades in each fan, and the quantities and dimensions of air passage ways are all subject to specific design for specific aircraft size and functional requirements and may vary from the general design indicated here in these areas of detail. The contents of the central core tube 28, shown for example in FIGS. 5 and 6, are not shown in FIG. 4 for clarity of illustration.

Figure 5:
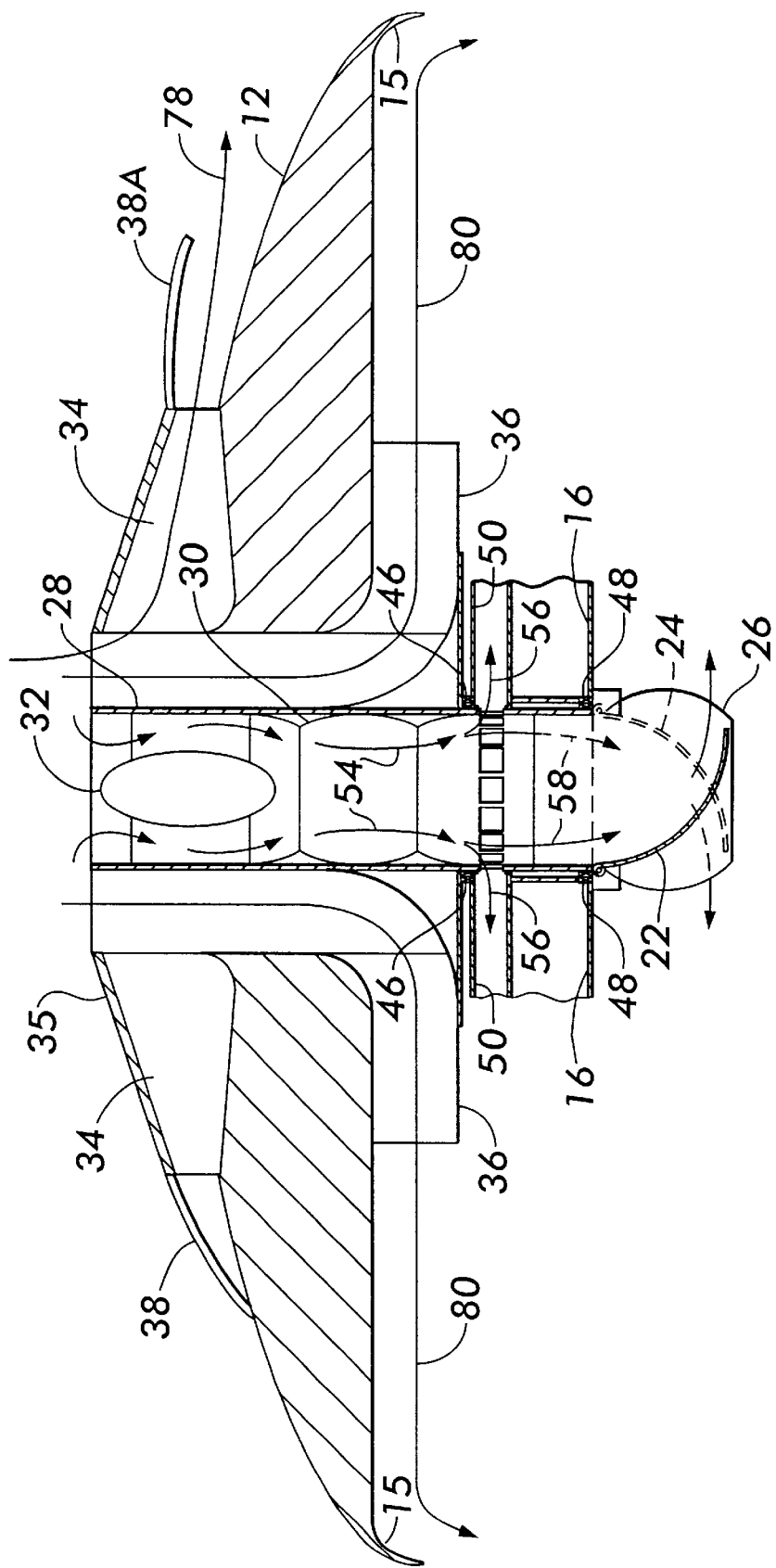
FIG. 5 is a cross-sectional elevation view taken along a vertical plane through the center of the blown rotating airfoil and core tube area.

Referring now more particularly to FIG. 5, this cross-sectional elevation view of the airfoil 12 and upper and lower fans 34 and 36 provides an understanding of how air is directed over the upper surface of the airfoil 12 by the upper fan 34 when the upper fan exhaust covers 38A are open. This air flow 78 over the upper surface of the airfoil 12 generates a low pressure and a lifting force on the upper surface of the airfoil 12. Similarly intake air for the lower fan 36 passes vertically down through air passages 82 in the center of the airfoil 12 where it is accelerated outward by the lower fan 36. The exhaust air from the lower fan 36 passes outward horizontally until it meets the depending lip 15 at the periphery of the airfoil 12 where this airflow is then directed downward. The turning downward of the air stream moving outward over the lower surface of the airfoil 12 creates a lifting force in the lower surface of the airfoil 12.

Figure 6:
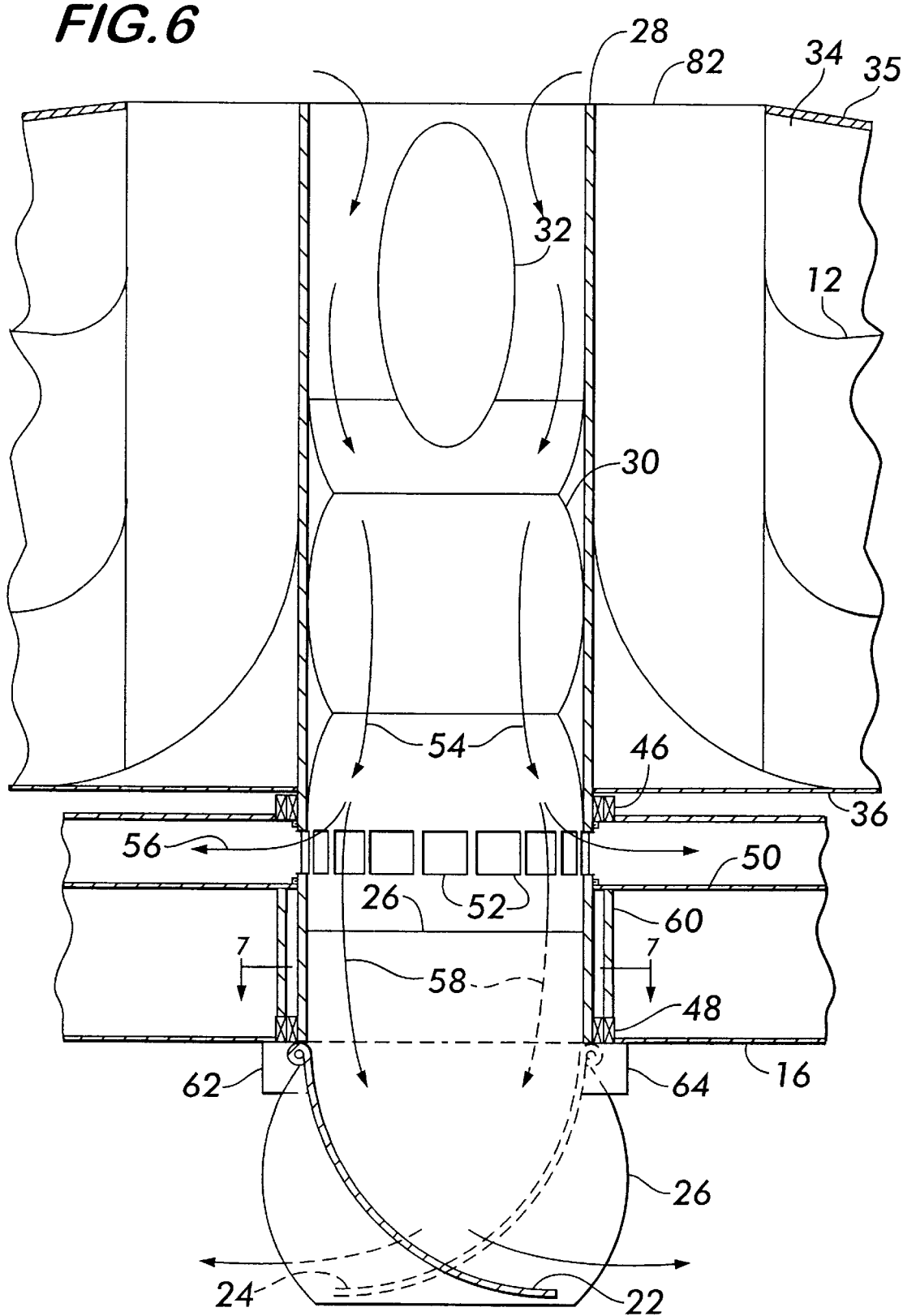
FIG. 6 is a cross-sectional broken away view taken along the dotted section line labeled FIG. 6 in FIG. 1.
Figure 7:
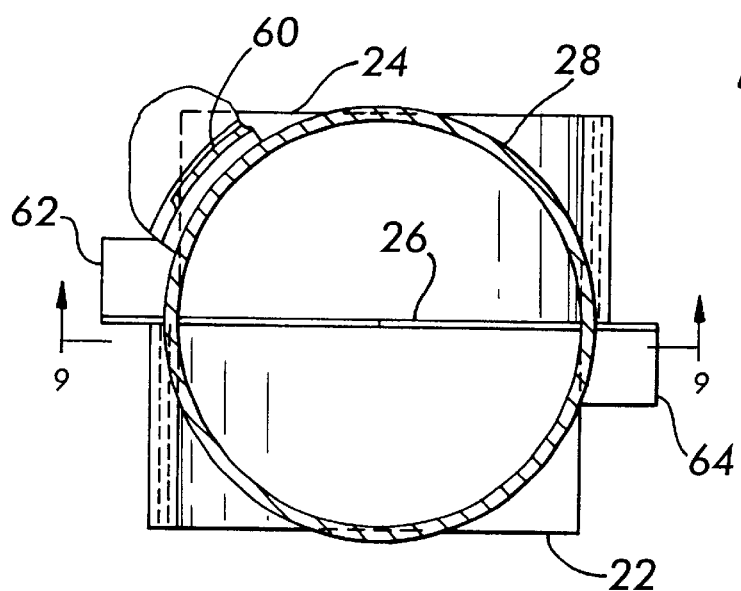
FIG. 7 is a cross-sectional view, partially broken away, taken along line 7—7 of FIG. 6.

Referring now more particularly to FIG. 6, taken in conjunction with FIGS. 1, 5, and 7–10, there is shown a cross-sectional view through the center of the aircraft 10 showing the central core tube 28, engine(s) 30 and other structure. Engine(s) 30 preferably may be a jet engine, a turbojet or turbofan engine, although any suitable engine such as a propeller engine may be feasible. Central core tube 28 has mounted therein a fuel tank 32 as the central core tube 28 is a convenient and stable location for such mounting. However, it is understood that other suitable locations may be utilized for the fuel tank, including an annular design located within the airfoil 12 or other suitable locations. Engine 30 is mounted to and rotates with the central core tube 28, airfoil 12 and upper and lower fans 34 and 36, that is they corotate. Continuing to refer to FIG. 6, while simultaneously also referencing FIGS. 7 through 10, as well as FIG. 1, non-rotating payload compartment 16 is shown to be mounted on upper bearings 46 and lower bearings 48. Payload compartment 16 may be provided with a wall 60 separating payload compartment 16 from central core tube 28. The upper portion of payload compartment 16 may be provided with an air plenum 50 integrally formed as a part of non-rotating payload compartment 16, or this plenum may be an independent non-rotating structure. However, in a presently preferred embodiment, air plenum 50 would integrally form a part of non-rotating payload compartment 16.

Central core tube 28 is provided with a plurality of openings 52 which enable exhaust gases from engine 30, as shown by arrows 54, to exit into air plenum 50, as shown by arrow 56, as well as to continue directly downward through central core tube 28 as shown by arrows 58.

The downwardly directed exhaust gases as shown by arrows 58 are divided by an exhaust divider plate 26. Exhaust divider plate 26 divides the exhaust into two equal streams such that each stream may be deflected in a different direction from the other by means of moveable exhaust deflectors 22 and 24. When movable exhaust deflectors 22 and 24 are positioned as shown in FIGS. 1 and 6, central core tube 28 along with the airfoil 12, as well as the attached upper and lower fans 34 and 36, engine(s) 30 and fuel tank 32, are caused to rotate. The exhaust gases deflected in this manner may cause high speed rotation. Further, the amount of the deflection and the degree of rotation may be controlled both by the exhaust gas flow rate and by the angle of exhaust deflectors 22 and 24. Further, the opening of the exhaust deflectors in a manner similar to that shown in FIG. 10 allows the exhaust gases shown by arrows 58 to provide a substantial amount of vertical lift by the jet action of the exhaust gases' downward thrust, especially when the deflectors are open. The position of exhaust deflectors 22 and 24 may be controlled by suitable control means 62 and 64, which may be any suitable type of control means including gears driven by an electric motor, pneumatic, hydraulic or any other suitable controllable drive means.

Figure 9:
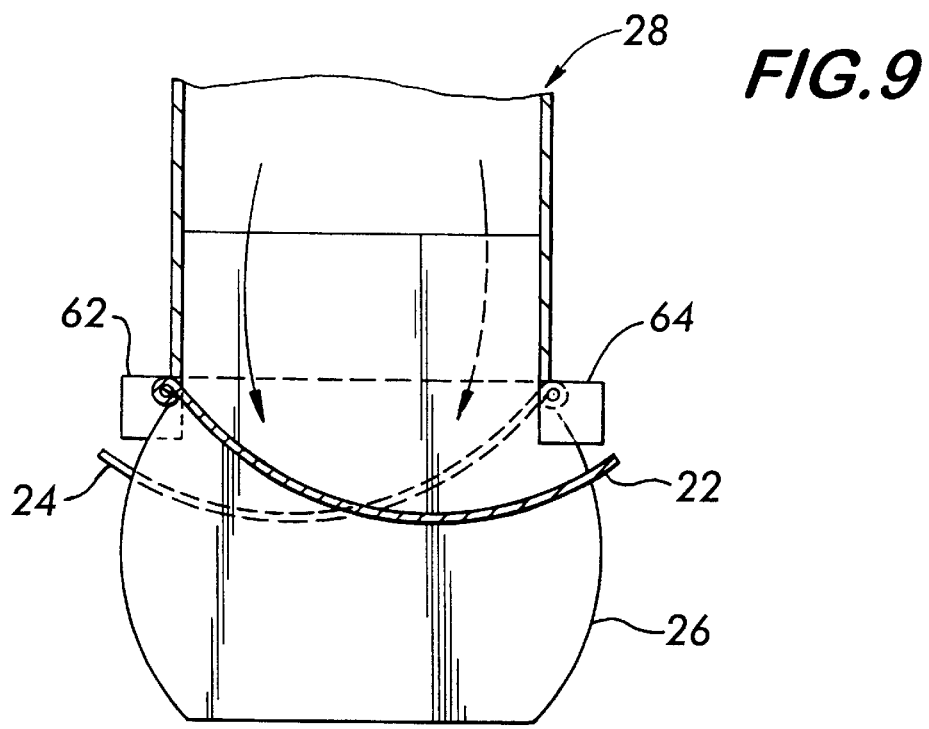
FIG. 9 is a cross-sectional view taken along line 9—9 of FIG. 7 with the exhaust deflectors 22 and 24 shown in a substantially retracted position.
Figure 10:
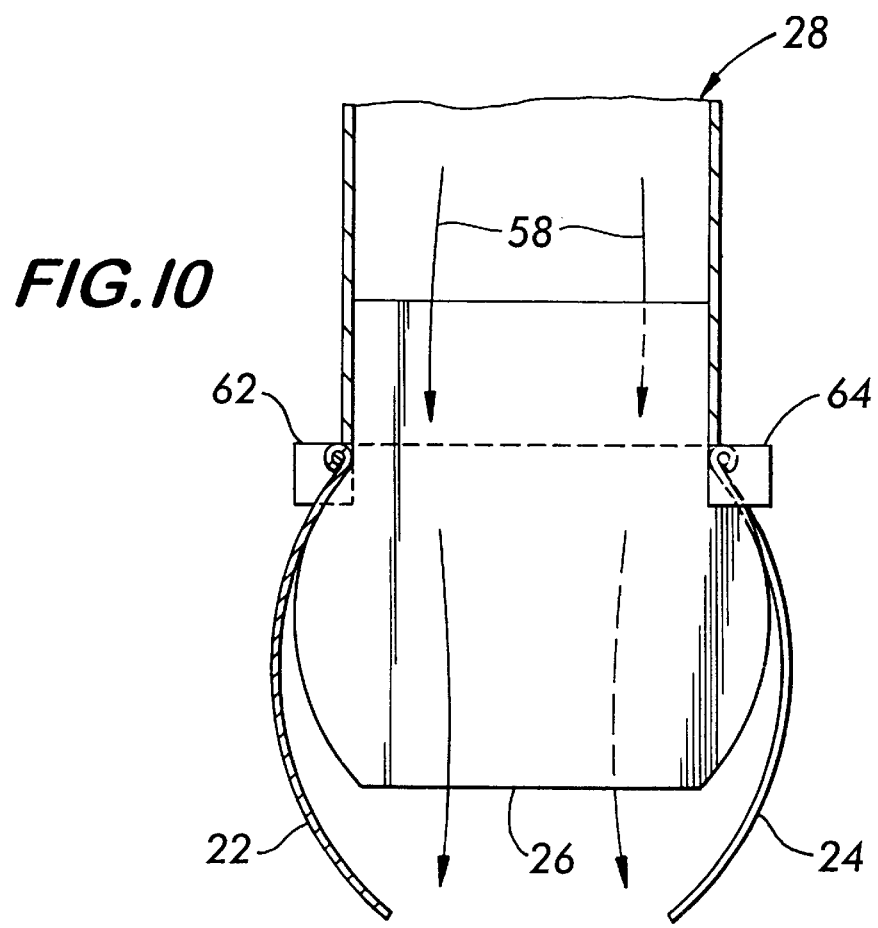
FIG. 10 is a cross-sectional view of the structure shown in FIG. 9 with exhaust deflectors 22 and 24 shown in the open position.

Exhaust deflectors 22 and 24 are shown in another position in FIG. 9 wherein, although rotation of the center core tube 28 is provided, the exhaust output is substantially obstructed to maximize the pressure and/or flow rate of these gases into the plenum 50 where these gases may then be used to provide lateral acceleration of the aircraft.

Figure 8:
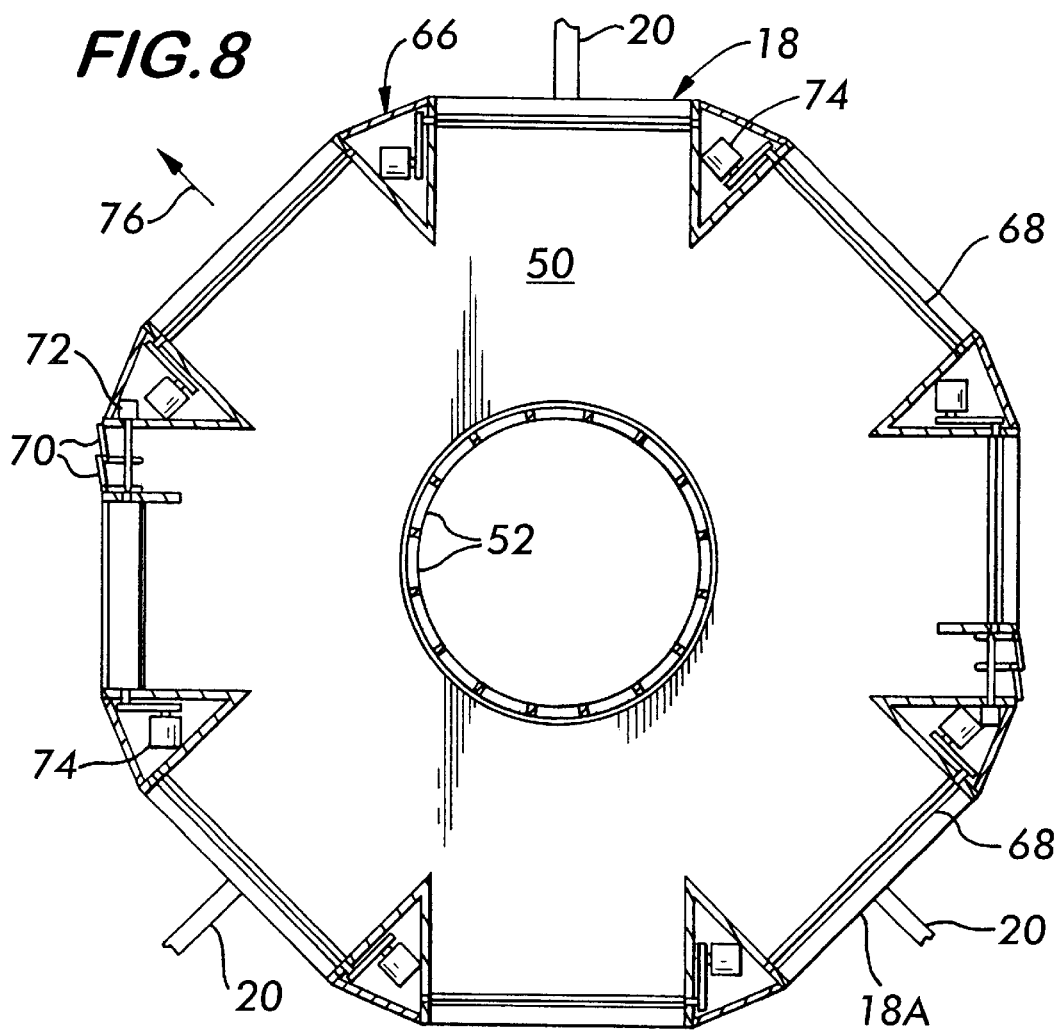
FIG. 8 is a cross-sectional view taken along line 8—8 of FIG. 1.

Referring now more particularly to FIG. 8 taken in conjunction with FIGS. 6 and 1, the exhaust or air plenum 50 is shown with the openings 52 in central core tube 28 feeding exhaust into plenum 50. The outer circumference 66 of air plenum 50 is provided with a plurality of lateral motion jet ports 18, each of which is controllably opened or closed by a plurality of vanes 68. As may best be seen in FIG. 1 in a presently preferred embodiment, two vanes would be utilized in each opening, however, it is understood that more or less vanes may be utilized depending upon the preference of the designer, and it is explicitly stated that a single vane could be utilized or it is contemplated that ten or more vanes could be utilized to controllably open and close each lateral motion jet port 18.

In addition to the horizontally arranged controllable vanes 68, a plurality of the lateral motion jet ports may be provided with controllable vanes 70 positioned in a vertical attitude to controllably direct the flow of exhaust gases in a direction counter to the direction of rotation of airfoil 12 thereby providing a counter-rotation or stabilization force to maintain plenum 50 as well as payload compartment 16 non-rotating. Vanes 70 compensate for the fact that bearings 46 and 48 are not perfectly frictionless. Vertical vanes 70 may be controllably operated by a suitable motor drive 72 and vanes 68 may be driven by a suitable controllable motor drive 74. Both controllable motor drives 72 and 74 may be any suitable type of motor drive including electromechanical, electrical gear-driven, pneumatic, hydraulic or any other suitable drive to selectively control the position of the vanes.

The lateral motion jet ports provide a jet action to drive aircraft 10 in a particular direction. For example, if it were desired that aircraft 10 begin to move in the direction of arrow 76, the vanes 68 of lateral motion jet port 18A would be opened, preferably with all of the remaining vanes closed to prevent unwanted forces in other directions and to prevent aerodynamic drag. Of course, depending upon the amount of force needed to resist the rotation and overcome the friction of bearings 46 and 48, vertical vanes 70, are opened just sufficiently to overcome the friction of these bearings and to maintain the payload compartment, as well as plenum 50, in a stable non-rotating condition.

The present invention illustrated in FIGS. 1 through 10 includes three means of lift or vertically upward directed acceleration.

First lift is generated by the air flows provided by the outputs of the upper and lower fans 34 and 36 as these air flows act on the upper and lower surfaces of the rotating airfoil 12 as may best be seen in FIG. 2 by the direction of the air flow arrows 78 and 80. Air flow 78 moves outward from the upper fan 34 over the upper surface of the airfoil 12 and creates a lower-than-atmospheric air pressure over the top surface of the airfoil 12 as a result of air flow 78. Air flow 80 moves outward from the lower fan 36 under the lower surface of the airfoil 12 until it meets the outer, downward extending lip 15 of the airfoil 12 where this air flow 80 is turned downward. Turning the mass of this air flow 80 downward creates a higher-than-atmospheric pressure under the lower surface of the airfoil. These two pressures acting on the upper and lower surfaces of the airfoil 12 create a lifting force in the airfoil.

A second means of lift is available when the aircraft 10 is moving laterally through the atmosphere. When the aircraft is moving laterally, the air flow path over the upper surface of airfoil 12 is longer than the air flow path over the lower surface of the airfoil resulting in higher velocity air movement and lower pressure over the upper surface as compared with the lower surface of the airfoil. This pressure difference provides an additional source of aerodynamic lift, sometimes referred to as air foil lift or lift in accordance with the Bernoulli effect principle.

Thirdly, the exhaust from the engines as described previously, in particular with FIG. 10, provides an upward force due to the reaction of the downwardly directed exhaust gases.

The three sources of lift described above are not all necessarily used at the same time and in some cases all three are not available. For example, during start up operations and before the fans and airfoil have reached full rotational speed, full airfoil rotational lift is not available. Similarly, lateral airfoil lift is not available if the airfoil 12 is not in lateral motion with regard to the ambient atmospheric environment, such as during a perfectly vertical take off in still air.

Requirements for lift are also variable. For example, payloads and fuel loads are variable. Additionally, gravitational effects are reduced at higher altitudes thereby reducing lift requirements. Combinations of rotational airfoil lift and lateral air foil lift may be used for take offs that are not strictly vertical, but are accomplished in a relatively small area as compared to a conventional fixed wing aircraft. The present invention described with respect to FIGS. 1 through 10 may incorporate a comprehensive lift management control system that integrates and controls all lift sources and lift requirements at every instant of time.

Aircraft descent is primarily accomplished by reducing the lift of the aircraft and this is largely accomplished by reducing the rate of rotation of the airfoil and by reducing the rate of lateral motion with respect to the ambient atmosphere.

The fact that multiple, complementary sources of lift are incorporated in the present invention means that no one of them must be sized to accommodate all lift requirements. This may provide a significant improvement in efficiency and economy as compared to alternate aircraft lift approaches. Additionally, since the present invention incorporates multiple, complementary sources of lift, this built in redundancy factor adds to the safety margin of the vehicle. It is further noted that unique advantages in efficiency and economy are produced by the fact that one power source may serve all primary power needs of the aircraft, although some of these may be provided by other power sources, such as additional engines for redundancy. The four power requirements include:

1. Power to rotate the airfoil and its fans;
2. Power to be used as an extra source of vertical thrust for special situations (such as "popping" the aircraft off the ground during a take off operation);
3. Power for lateral motion jet ports to provide lateral acceleration and braking; and
4. Power to operate the payload compartment counter rotation jet ports.

The present invention of FIGS. 1 through 10, if optimized for very high speed lateral motion, also offers significant benefits in the area of aerodynamic heating. A major component of the vehicle that impinges on the atmosphere is the airfoil 12 and this component rotates. Therefore, heat absorbed by each portion of the airfoil 12 while it is in the leading edge position is dissipated during the time that that portion is not in the leading edge position.

The present invention also provides substantial platform stability resulting from the gyroscopic action of the rotating envelope.

The present invention may be embodied in other specific forms without departing from the spirit or essential attributes thereof and, accordingly, reference should be made to the appended claims, rather than to the foregoing specifications as indicating the scope of the invention.

I claim:

1. An aircraft, comprising:
    a circular shaped airfoil having an upper surface;
    means for rotating said airfoil, wherein said means for rotating said airfoil includes an engine for causing gaseous fluid flow directed towards controllable deflectors, said controllable deflectors being adjustably adapted to cause selective amounts of rotation and lift; and
    means for causing airflow across said upper surface of said airfoil to produce lift of said airfoil.

2. An aircraft in accordance with claim 1 wherein said airfoil is provided with a lower surface and including second means for causing airflow outwardly and downwardly from said lower surface to produce lift of said airfoil.

3. An aircraft in accordance with claim 2 wherein said second means includes a downwardly projecting lip on the periphery of said lower surface.

4. An aircraft in accordance with claim 1 wherein said means for causing airflow across said upper surface of said airfoil is attached to and adapted to rotate with said airfoil.

5. An aircraft in accordance with claim 2 wherein said second means for causing airflow outwardly and downwardly from said lower surface is attached to and adapted to rotate with said airfoil.

6. An aircraft in accordance with claim 1 including a plurality of lateral motion jet ports which are controllably openable and closable to selectively control at least a portion of the gaseous flow from said engine to provide a controllable lateral force to control lateral motion.

7. An aircraft in accordance with claim 1 wherein said circular shaped airfoil is caused to rotate during lateral flight to provide cooling of the leading edge of said airfoil in the direction of flight.

8. An aircraft, comprising:
    a circular shaped airfoil having an upper surface and a lower surface;
    means for rotating said airfoil, wherein said means for rotating said airfoil includes an engine for causing gaseous fluid flow directed towards controllable deflectors, said controllable deflectors being adjustably adapted to cause selective amounts of rotation and lift; and
    means attached to and adapted to rotate with said airfoil for causing airflow across said upper surface of said airfoil and across and downwardly from said lower surface of said airfoil to produce lift of said airfoil.

9. An aircraft in accordance with claim 8 which includes a downwardly projecting lip on the periphery of said lower surface.

10. An aircraft in accordance with claim 8 including a plurality of lateral motion jet ports which are controllably openable and closable to selectively control at least a portion of the gaseous flow from said engine to provide a controllable lateral force to control lateral motion.

11. An aircraft in accordance with claim 8 wherein said circular shaped airfoil is caused to rotate during lateral flight to provide cooling of the leading edge of said airfoil in the direction of flight.

12. An aircraft, comprising:
    a circular shaped airfoil having a convex upper surface;
    means for rotating said airfoil;
    a centrifugal fan centrally and integrally mounted to said circular shaped airfoil and extending above said upper surface of said circular shaped airfoil whereby said centrifugal fan rotates with said circular shaped airfoil;
    said means for rotating said airfoil being integral with and rotating with said airfoil such that the rotating centrifugal fan extending above and integral to said convex upper surface causes airflow across said convex upper surface of said airfoil to produce lift of said airfoil.

13. An aircraft in accordance with claim 12, including:
    a second circular shaped airfoil provided with a substantially flat lower surface with a downward turned lip at its periphery;
    a second centrifugal fan extending below and integral with said second circular airfoil wherein said second centrifugal fan rotates with said second circular shaped airfoil; and
    wherein said second centrifugal fan integral with an extending below said lower surface of said second circular airfoil causes airflow across said lower surface and said downward turned lip of said second circular airfoil to produce lift of said airfoil.

14. An aircraft in accordance with claim 12, including:
    exhaust covers for said centrifugal fan, said exhaust covers being controllably openable and closable such that said exhaust covers may be open to increase lift and may be closed to enhance airflow over said circular shaped airfoil during lateral flight.

15. An aircraft in accordance with claim 12 wherein said means for rotating said airfoil includes an engine for causing gaseous flow directed towards controllable deflectors, said controllable deflectors being adjustably adapted to cause selected amounts of rotation and lift.

16. An aircraft in accordance with claim 15, including:
    a plurality of lateral motion jet ports which are controllably openable and closeable to selectively control at least a portion of the gaseous flow from said engine to provide a controllably lateral force to control lateral motion.

17. An aircraft in accordance with claim 12 wherein said circular shaped airfoil is caused to rotate during lateral flight to provide cooling of the leading edge of said airfoil in the direction of flight.

* * * * *